(12) United States Patent
You et al.

(10) Patent No.: US 7,002,644 B2
(45) Date of Patent: Feb. 21, 2006

(54) LIQUID CRYSTAL DISPLAY DEVICE HAVING ELECTROMAGNETIC SENSOR

(75) Inventors: Dong Jae You, Kumi-shi (KR); Nam Do Son, Kyongsangnam-do (KR); Sung Hoon Lee, Taegu-kwangyokshi (KR)

(73) Assignee: LG.Philips LCD Co., Ltd, Seoul (KR)

( * ) Notice: Subject to any disclaimer, the term of this patent is extended or adjusted under 35 U.S.C. 154(b) by 152 days.

(21) Appl. No.: 10/745,704

(22) Filed: Dec. 29, 2003

(65) Prior Publication Data

US 2004/0189888 A1    Sep. 30, 2004

(30) Foreign Application Priority Data

Mar. 28, 2003   (KR)   .................... 10-2003-0019629

(51) Int. Cl.
*G02F 1/1333*   (2006.01)
*G02F 1/1335*   (2006.01)

(52) U.S. Cl. ............................. 349/58; 349/61; 345/87; 345/104; 345/173; 345/174

(58) Field of Classification Search .................. 349/12, 349/58, 61, 173, 174, 104, 87; 361/681, 361/752

See application file for complete search history.

(56) References Cited

U.S. PATENT DOCUMENTS

| 5,381,160 A | * | 1/1995 | Landmeier | ................... 345/174 |
| 6,657,615 B1 | * | 12/2003 | Harada | ........................ 345/173 |
| 2002/0154250 A1 | * | 10/2002 | An | .............................. 349/12 |

* cited by examiner

*Primary Examiner*—Huyen Ngo
(74) *Attorney, Agent, or Firm*—McKenna Long & Aldridge LLP

(57) ABSTRACT

An LCD device having an EM sensor is disclosed for preventing a mistake in location detection, in which a lamp housing is formed of a flexible material, and a supplementary lamp housing is formed to support the flexible lamp housing. The LCD device includes an LCD panel; a backlight unit having a light-guiding plate below the LCD panel, a fluorescent lamp at one side of the light-guiding plate, and a reflecting plate on a lower surface of the light-guiding plate; a first lamp housing of a flexible material extending from the lower side of the reflecting plate and surrounding the fluorescent lamp at one side of the light-guiding plate; a second lamp housing surrounding and supporting the first lamp housing; a main supporter supporting the LCD panel and the backlight unit; an EM sensor below the main supporter and first and second lamp housings; and a case top surrounding the main supporter and the circumference of the LCD panel.

16 Claims, 3 Drawing Sheets

LIQUID CRYSTAL DISPLAY DEVICE HAVING ELECTROMAGNETIC SENSOR

This application claims the benefit of the Korean Application No. P2003-19629 filed on Mar. 28, 2003, which is hereby incorporated by reference.

BACKGROUND OF THE INVENTION

1. Field of the Invention

The present invention relates to a liquid crystal display (LCD) device, and more particularly, an LCD device having an electromagnetic (EM) sensor for preventing a mistake in a location detection, in which a lamp housing is formed first of a flexible material, and a supplementary lamp housing is formed to support the flexible lamp housing at a lamp side except a light-guiding plate.

2. Discussion of the Related Art

In a personal information processor such as a personal computer and a mobile transmission device, various input devices such as a keyboard, a mouse and a digitizer have been generally used for text and graphic processing. Because the personal computer is used in various fields, it is necessary to replace input devices such as the keyboard and the mouse with a touch panel due to demands for mobility and simplicity, whereby a user can input information such as letters on the touch panel while carrying the same. The touch panel has been developed from a device satisfying a general input function to a high-technology device having reliability and long life.

A touch panel is known as an input device having simplicity, mobility, operation reliability and letter input functionality. Capable of sensing when a user touches a display surface, touch panels are classified as resistive type, capacitive type, and an electromagnetic (EM) type. The resistive type touch panel detects a location of a touching point by pressure while applying a D.C. voltage in accordance with a change of capacity. The capacitive type touch panel detects a location of a touching point by using Capacitance Coupling while applying an A.C. voltage. Also, the EM type touch panel detects a location of a touching point by detecting a resonance frequency resonated as an induced voltage while applying an electromagnetic field. Each type of touch panel has signal amplification problems, resolutions and development difficulty. Various optical, electrical, mechanical and input characteristics as well as endurance and cost are considered as criteria for choosing a particular type of touch panel. Recently, the EM type touch panel has attracted great attention.

The LCD device does not emit light in itself. That is, the LCD device displays a picture image by controlling light transmittance from an external source. Thus, the LCD device requires an additional light source such as a backlight. At this time, the LCD device uses a light source such as an Electro Luminescence (EL), a Light Emitting Diode (LED), a Cold Cathode Fluorescent Lamp (CCFL) or a Hot Cathode Fluorescent Lamp (HCFL). The CCFL has a long lifetime, low power consumption and thin profile and is used as the light source for large-sized color TFT LCD devices.

In the case of the cold cathode fluorescent lamp (CCFL), a fluorescent discharge tube is used for a penning effect, which is formed by injecting a hydrargyrum Hg gas containing Argon Ar and Neon Ne at a low temperature. Also, electrodes are formed at both ends of the fluorescent discharge tube, and the cathode is formed in a plate-shape. When a voltage is applied to the discharge tube, electric charges inside the fluorescent discharge tube collide against the plate-shaped cathode in a sputtering state, thereby generating secondary electrons. Thus, circumferential elements are excited by the secondary electrons, and plasma is generated. Also, the circumferential elements emit strong ultraviolet rays. The ultraviolet rays excite a fluorescent substance and thereby emit visible rays.

The backlight may be classified as a direct-type and an edge-type based upon the position of a lamp unit.

In the edge-type method, a lamp unit is formed at one side of a light-guiding plate. The lamp unit includes a lamp, a lamp holder and a lamp reflecting plate. The lamps, emitting light, are inserted into both sides of the lamp holder, whereby the lamp is protected from an external impact. Also, the lamp reflecting plate surrounds a circumferential surface of the lamp, and one side of the lamp reflecting plate is inserted to one side of the light-guiding plate to reflect the light emitted from the lamp to the light-guiding plate. Generally, the edge-type method of forming the lamp unit at the one side of the light-guiding plate is applied to relatively small-sized LCD devices such as monitors for laptop type computers or desktop type computers. The edge-type method is useful to obtain uniform luminance, long lifetime and thin profile in the LCD device.

With the trend of the large-sized LCD devices of 20-inch or more, the direct-type method is being actively developed. With the direct-type method, a plurality of lamps are formed in one line on a lower surface of a light-diffusion plate, whereby the entire surface of the LCD panel is directly illuminated with the light. The direct-type method, which has greater light efficiency as compared with that of the edge-type method, is used for large-sized LCD devices that require high luminance. That is, the LCD devices of the direct-type method are generally used for a large-sized monitor or the television. The large-sized monitor or the television may be driven for a long time, and has a plurality of lamps, whereby it tends to have the lamps being turned off. However, in the LCD device of the edge-type method having lamp units at both sides of the light-guiding plate, it does not cause big problems except the decrease of the luminance even though one lamp is turned off. Meanwhile, in the direct-type LCD device, a plurality of lamps are formed underneath a screen. Accordingly, if one of the lamps is turned off due to troubles with the lamp or the end of the lamp life, a screen portion corresponding to the turned-off lamp portion becomes darker as compared with surrounding portions of the screen. In this respect, the direct-type LCD device has to have a simple structure suitable for disassembly and assembly of the lamp unit.

Hereinafter, a LCD device having the edge-type backlight and the EM sensor according to the related art will be described with reference to the accompanying drawings.

FIG. 1 illustrates a structure of a general backlight assembly. As shown in FIG. 1, the general backlight assembly is provided with a fluorescent lamp 1, a light-guiding plate 2, a light-diffusion substance 3, a reflecting plate 4, a light-diffusion plate 5 and a prism sheet 6. When a voltage is applied to the fluorescent lamp 1, electrons remaining in the fluorescent lamp 1 move to the anode, and the remaining electrons collide with argon Ar, whereby the argon Ar is excited. As a result, positive ions are generated, and the positive ions collide against the cathode, thereby generating secondary electrons. When the secondary electrons are discharged to the fluorescent lamp 1, the flow of the electrons collides with hydrargyrum vapor, and then ionized, thereby emitting ultraviolet rays and visible rays. Then, the emitted ultraviolet rays excite a fluorescent substance deposited inside the fluorescent lamp, thereby emitting light.

Subsequently, the light-guiding plate 2 is a Light Wave-Guide causing the light emitted from the fluorescent lamp 1 to be incident on the LCD, as a plate type light source. The light-guiding plate 2 may be formed of Poly Methyl Meth Acrylate (PMMA) resin having a great light transmittance. The light incidence of the light-guiding plate 2 is related to the ratio between the light-guiding plate thickness and the fluorescent lamp diameter, the distance between the light-guiding plate and the fluorescent lamp 1, and the shape of the reflecting plate. Generally, the fluorescent lamp 1 is slanted on the center of the light-guiding plate 2 at the thickness direction, thereby improving efficiency of the light incidence. The light-guiding plate 2 for the backlight unit of the LCD device is divided into a printing-type light-guiding plate, a V-cut type light-guiding plate, and a scattering-type light-guiding plate.

Next, a light-diffusion substance 3 may include $SiO_2$ particles, PMMA and solvent. At this time, $SiO_2$ particles having porosity are used for diffusing the light. Also, PMMA is used for adhering $SiO_2$ particles to a lower surface of the light-guiding plate 2. The light-diffusion substance 3 is deposited on the lower surface of the light-guiding plate 2 in dotted patterns, and the sizes of the dotted patterns are gradually increased to obtain a uniform plate-type light source on an upper surface of the light-guiding plate 2. That is, the dotted pattern has a small size in a unit area near to the fluorescent lamp 1, and the dotted pattern has a large size in a unit area away from the fluorescent lamp 1. The shape of the dotted pattern may be varied. In the case of the dotted patterns having the same size, the respective dotted patterns have the luminance of the same level regardless of the dotted shape.

Subsequently, the reflecting plate 4 is formed at the rear of the light-guiding plate 2, whereby the light emitted from the light guiding plate 2 is reflected back inside of the light-guiding plate 2. Also, the light-diffusion plate 5 is formed on the upper surface of the light-guiding plate 2 to obtain a uniform luminance at each viewing angle. The light-diffusion plate 5 may be formed of PET or Poly Carbonate (PC) resin, and a particle-coating layer is formed on the light-diffusion plate 5 for diffusing the light.

Next, the prism sheet 6 is formed to improve the frontal luminance of the light transmitted and reflected to the upper side of the light-diffusion plate 5. The prism sheet 6 transmits the light of a predetermined angle, and the light incident at the other angles is totally reflected, whereby the light is reflected to the lower side of the prism sheet 6 by the reflecting plate 4 formed on the lower side of the light-guiding plate 2. The backlight assembly having the aforementioned structure is fixed to a mold frame, and a display unit disposed at an upper side of the backlight assembly is protected by a top sash. Also, the backlight assembly and the display unit are received between the top sash and the mold frame being coupled to each other.

FIG. 2 is a cross-sectional view illustrating an LCD device having an EM sensor according to the related art. As shown in FIG. 2, the LCD device includes a fluorescent lamp 11, a lamp housing 12, a light-guiding plate 13, a reflecting plate 14, a light-diffusion plate 15, a prism sheet 16, a protection sheet 17, and a main supporter 18. At this time, a fluorescent substance is coated inside the fluorescent lamp 11 for emitting light. Also, the lamp housing 12 fixes the fluorescent lamp 11, and concentrates the light emitted from the fluorescent lamp 11 in one direction. The light-guiding plate 13 provides the light emitted from the fluorescent lamp 11 to an upper side of an LCD panel, and the reflecting plate 14 adheres to a lower side of the light-guiding plate 13 to reflect the light leaking in an opposite side of the LCD panel to the light-guiding plate 13. The light-diffusion plate 15 is formed on an upper side of the light-guiding plate 13 to uniformly diffuse the light emitted from the light-guiding plate 13. Also, the prism sheet 16 is formed on an upper side of the light-diffusion plate 15 to concentrate the light diffused in the light-diffusion plate 15, and to transmit the concentrated light to the LCD panel, and the protection sheet 17 is formed on an upper side of the prism sheet 16 to protect the prism sheet 16. The main supporter 18 receives and fixes the aforementioned elements.

In the aforementioned backlight unit, the light emitted from the fluorescent lamp 11 is concentrated on an incident surface of the light-guiding plate 13, and then the concentrated light passes through the light-guiding plate 13, the light-diffusion plate 15 and the prism sheet 16, whereby the light is transmitted to the LCD panel 10. Also, an EM sensor 19 serving as an EM type touch panel is provided below the lamp housing 12 of aluminum Al material. That is, the EM sensor is overlapped with the lamp housing 12. At this time, in region B serving as an effective region of the EM sensor, mistakes may be generated in detecting the location of the touching point since the lamp housing 12 prevents electromagnetic transmission between the EM sensor 19 and an electronic (stylus) pen 7. In this case, a region A is not an effective region in the LCD panel 10, but the region A is an effective region in the EM sensor 19. A region B indicates a portion of the lamp housing 12 in the effective region of the EM sensor 19. A region C indicates a portion of the light-guiding plate in the non-effective region of the EM sensor 19.

Hereinafter, a structure and an operation of the EM sensor 19 will be described as follows.

In a general EM type touch panel, the EM sensor 19 is formed as a plate which includes two sets of array coils (or coils), one set being perpendicular to the other set. In the structure of the plate type coil, a plurality of coils are piled on a flexible PCB (flexible Printed Circuit Board), and each coil is formed for being apart from X-axis and Y-axis. Also, one end of each coil is connected to a ground voltage, and the other end is connected to one common reference electric potential line receiving a selective signal.

In a system having the EM sensor in the backlight, when the electronic (stylus) pen having a resonant circuit is positioned on the LCD panel, the EM sensor is driven by a D.C. signal to generate a resonant magnetic field. Then, the magnetic field induces a signal to the array coil. The signal induced to the array coil is detected by the controller below the backlight unit, and then compared, so that the location of the touching point is detected on the plate two-dimensionally.

The EM sensor 19 includes the plurality of coils, and the coils are formed of a conductive material having light-shielding characteristics. As a result, it is possible to prevent a decrease of light transmittance by positioning the EM sensor below the reflecting plate 14 of the backlight unit. The resistive type or capacitive type touch panel has to be mounted on the display device to detect the location of the touching point. However, in the case of the EM type touch panel, the sensor may be apart from the display surface, which is touched by a user, for detecting the location of the touching point because the electromagnetic force is transmitted through the display device and light source.

However, the LCD device having the EM sensor according to the related art has the following disadvantages.

The lamp housing that concentrates the light emitted from the lamp is formed of aluminum Al. Thus, at a portion where the lamp housing is overlapped with the EM sensor, mistakes may be generated in detecting the location of the touching point because the lamp housing prevents electromagnetic transmission between the EM sensor and the electronic (stylus) pen.

SUMMARY OF THE INVENTION

Accordingly, the present invention is directed to an LCD device having an EM sensor that substantially obviates one or more problems due to limitations and disadvantages of the related art.

An object of the present invention is to provide an LCD device having an EM sensor for preventing a mistake in location detection, in which a lamp housing is first formed of a flexible material, and a supplementary lamp housing is then formed to support the flexible lamp housing at a lamp side except at the light-guiding plate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device having an EM sensor includes an LCD panel; a backlight unit having a light-guiding plate below the LCD panel, a fluorescent lamp at one side of the light-guiding plate, and a reflecting plate on a lower surface of the light-guiding plate; a first lamp housing of a flexible material extending from the lower side of the reflecting plate and surrounding the fluorescent lamp at one side of the light-guiding plate; a second lamp housing below the first lamp housing surrounding and supporting the first lamp housing; a main supporter supporting the LCD panel and the backlight unit; an EM sensor below the main supporter and first and second lamp housings; and a case top surrounding the main supporter and the circumference of the LCD panel.

The first lamp housing may be formed of a plastic film of any one of Poly Ethylene Terephtalate (PET), Poly Propylene Terephtalate (PPT), Poly Carbonate, and Poly Acrylate.

And, the second lamp housing may be formed of a metal material to surround the fluorescent lamp in a non-effective region of the EM sensor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device having an EM sensor according to the present invention will be described with reference to the accompanying drawings.

Figure 1:
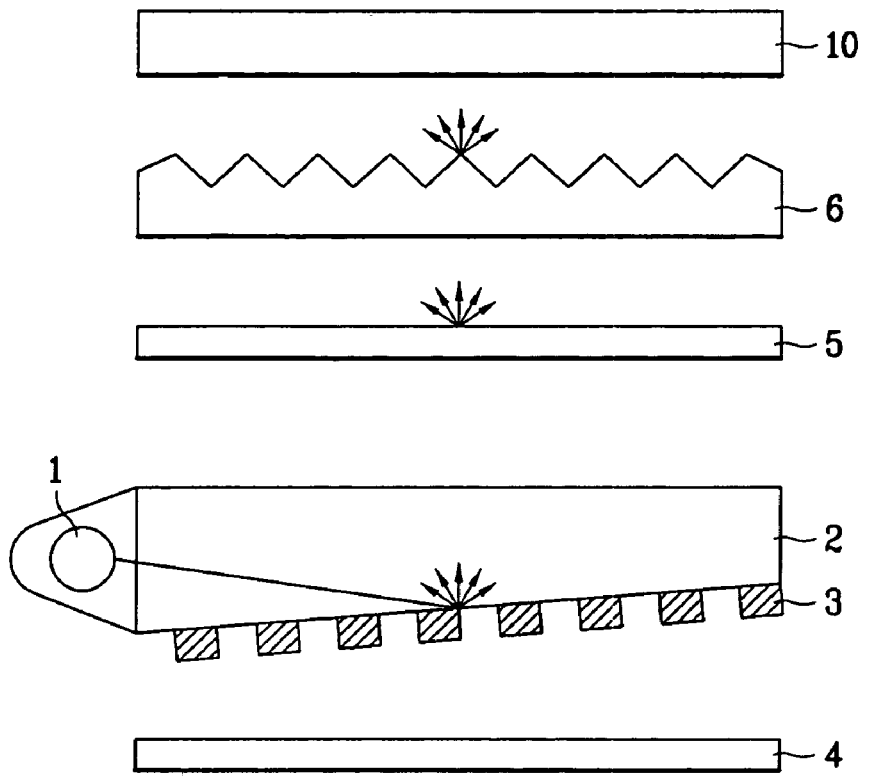
FIG. 1 schematically illustrates a general backlight assembly structure of the related art.
Figure 2:
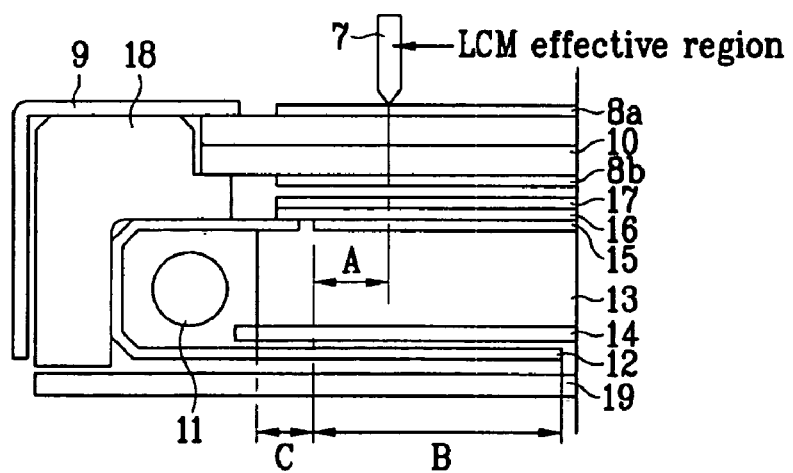
FIG. 2 is a cross-sectional view illustrating a LCD device having an EM sensor according to the related art.
Figure 3:
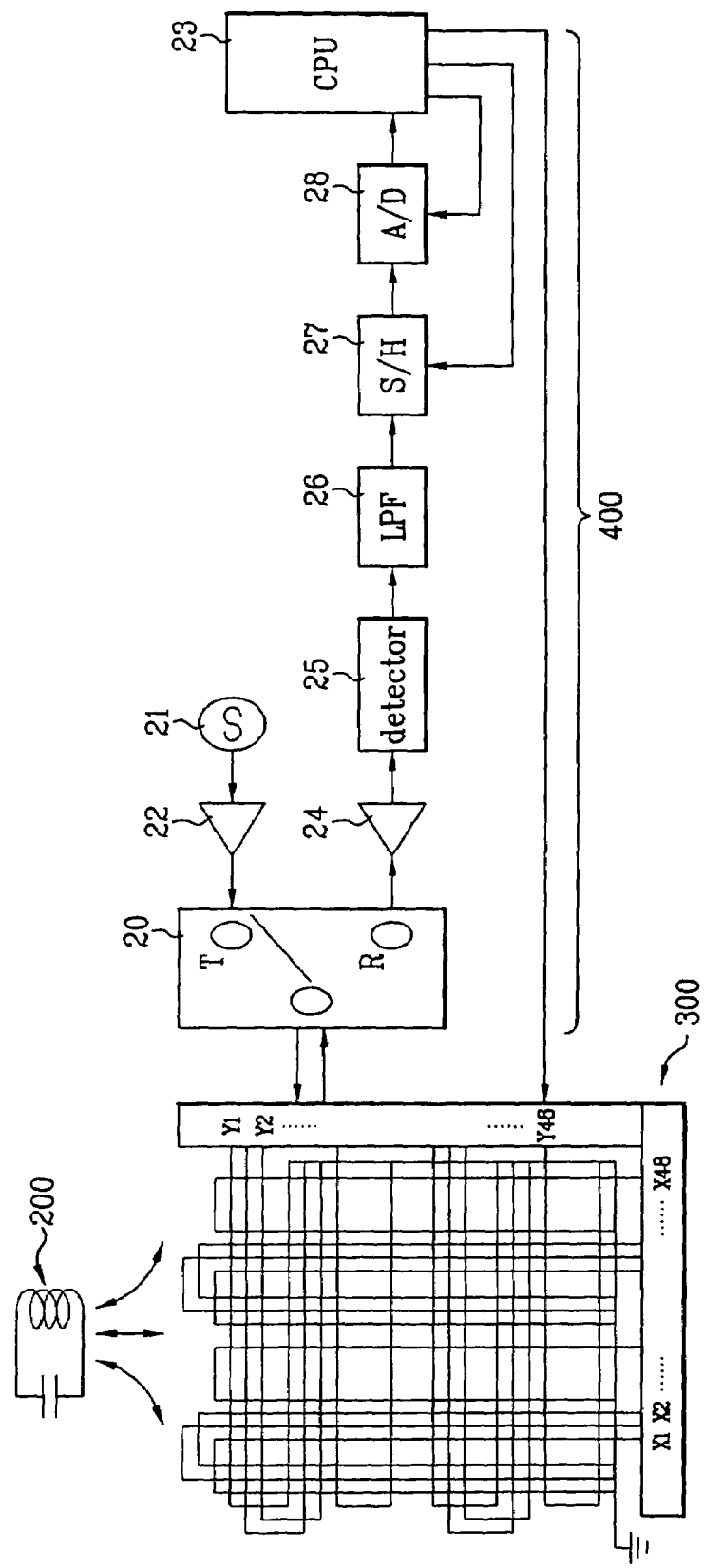
FIG. 3 is a block diagram illustrating an EM sensor and a driving circuit thereof according to the present invention.

FIG. 3 is a block diagram illustrating an EM sensor and a driving circuit thereof according to the present invention. As shown in FIG. 3, the EM sensor 300 according to the present invention includes X-axis and Y-axis coil arrays and X-MUX and Y-MUX coupled to the X-axis and Y-axis, respectively. Accordingly, a specified Y-axis coil is selected by a Y address signal (Y-ADDR), and a specified X-axis coil is selected by an X address signal (X-ADDR) for reading. Both X and Y address signals are generated from a controller 400.

The EM sensor 300 generates a signal induced by a specified coil through an electronic (stylus) pen 200 having a resonant circuit, thereby detecting a location of a touching point by the induced signal. The output signals from the selected Y-axis coil and X-axis coil are provided to the controller 400. The controller 400 includes an amplifier 24 for gradually amplifying the output signals. The amplified signals are provided to an analog-digital A-D converter 28 after passing through a detector 25, a low pass filter LPF 26 and a sample and hold S/H unit 27. The A-D converter 28 converts a size and a polarity of an analog signal to a digital format, and then inputs the digitally converted signal to a CPU 23. While the analog-digital A-D converter 28 digitizes a measured value of one coil, the sample and hold 27 unit holds the measured value of the coil and a second following coil measurement is started at a preceding circuit.

The EM sensor unit 300 includes a plurality of coils being piled up on a flexible PCB. Each coil is arrayed against X-axis and Y-axis, and has a first side connected to a ground voltage and a second side connected to a MUX unit in which one coil is chosen to be connected to an electric potential line of a fixed level. When a user handles the electronic pen 200 a sine wave current 22 generated in a sine wave generator 21 is applied to the electronic pen 200. Accordingly, a sine wave magnetic flux is generated around the electronic pen 200. If the electronic pen 200 is positioned on the sensor unit 300, a sine wave voltage of different sizes is induced in each coil arrayed in the sensor unit 300 according to the location of the electronic pen 200, and then input to the CPU 23 through the detector 25 and the analog-digital A-D converter 28. After that, the CPU 23 calculates a location value of the electronic pen 200 on the sensor unit 300 from the value induced to the coil, and outputs the angle value between 0° and 360°. The output data of the electronic pen 200 is applied to a LCD panel (40 of FIG. 4), or stored in the CPU 23.

It is more convenient for the user to draw a figure when an area of the sensor unit 300 is larger and more efficient when the resolution is higher. The resolution is inversely proportional to spaces between coils in the sensor unit 300.

That is, when the spaces between the coils are narrower, the resolution becomes higher. In the EM type touch panel, the sensor unit 300 includes the plurality of coils therein, so that it is possible to detect the location of the electronic (stylus) pen 200 by detecting the electromagnetic change. Accordingly, it is not required to position the sensor unit 300 at the front of the LCD panel 40. That is, unlike the resistive type touch panel, a digitizer of the sensor unit 300 may be formed at the rear of the LCD panel. Even though the LCD panel 40 is positioned on the sensor unit 300, it is possible to detect the location of the electronic (stylus) pen moving on the upper surface of the LCD panel 40 by the sensor unit 300 when there is a substance having uniform electromagnetic characteristics and transmitting electromagnetic force therethrough.

Figure 4:
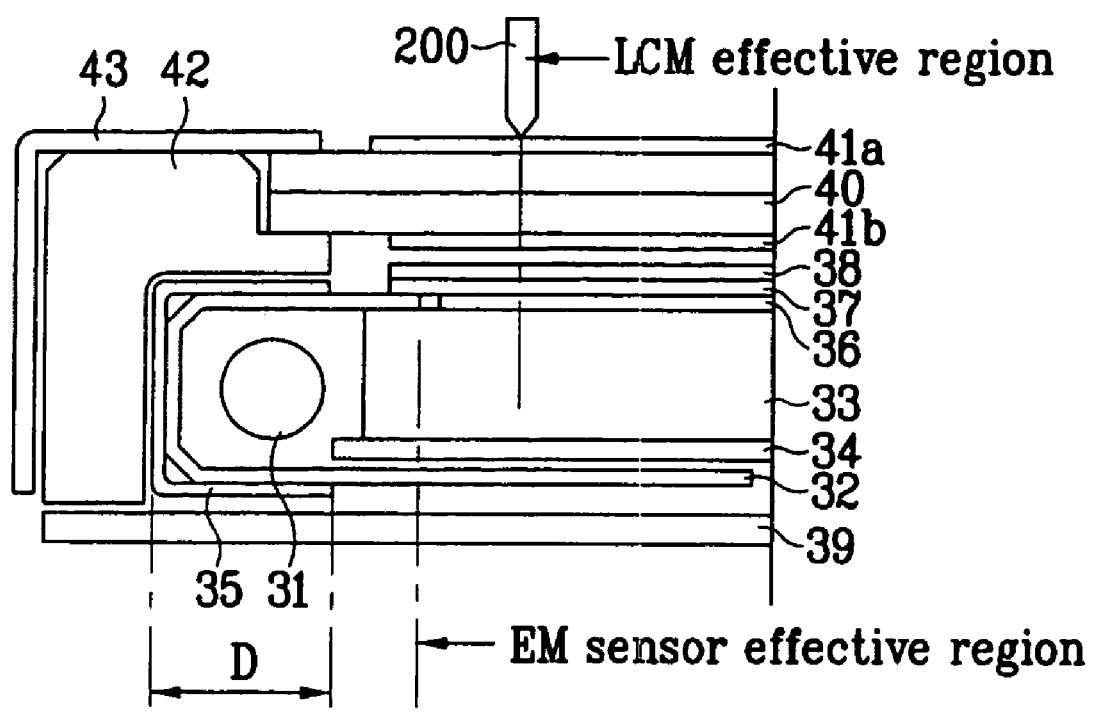
FIG. 4 is a cross-sectional view illustrating a LCD device having an EM sensor according to the present invention.

FIG. 4 is a cross-sectional view illustrating the LCD device having the EM sensor according to the present invention. Hereinafter, explanation for a LCD panel will be omitted, and a backlight unit will be described with reference to the accompanying drawings.

As shown in FIG. 4, the LCD device having the EM sensor according to the present invention includes a LCD panel 40, a fluorescent lamp 31, a first lamp housing 32, a light-guiding plate 33, a reflecting plate 34, a second lamp housing 35, a light-diffusion plate 36, a prism sheet 37, a protection sheet 38, a main supporter 42, and a case top 43. At this time, the LCD panel 40 includes upper and lower polarizing plates 41a and 41b, and the fluorescent lamp 31 is formed below the LCD panel 40 at one side thereof for emitting light. Also, the first lamp housing 32 is formed of a flexible film to concentrate the light emitted from the fluorescent lamp 31 at one direction, and the light-guiding plate 33 guides the light emitted from the fluorescent lamp 31 to the LCD panel 40 above the backlight. The reflecting plate 34 reflects the light leaking at an opposite side of the LCD panel 40 below the light-guiding plate 33 to the light-guiding plate 33. Then, the second lamp housing 35 is formed for surrounding the fluorescent lamp 31 below the first lamp housing 32, and the light-diffusion plate 36 is formed on the light-guiding plate 33 for uniformly diffusing the light guided by the light-guiding plate 33. The prism sheet 37 is formed on the light-diffusion plate 36 to concentrate the light diffused in the light-diffusion plate 36 at one direction, and to transmit the concentrated light to the LCD panel. The protection sheet 38 is formed on the prism sheet 37 for protecting the prism sheet 37, and the main supporter 42 receives and fixes the aforementioned components. The case top 43 is formed for surrounding the EM sensor 39 below the main supporter 42 and the first and second lamp housings 32 and 35, the LCD panel 40 and the main supporter 42.

In this case, the first lamp housing 32 is formed of a flexible film, which have no influence on the electromagnetic transmission, for example Poly Ethylene Terephtalate PET, Poly Propylene Terephtalate PPT, Poly Carbonate, and Poly Acrylate. Also, the first lamp housing 32 is overlapped with one side of the reflecting plate for surrounding the fluorescent lamp 31. Accordingly, the electromagnetic transmission is smoothly performed in the portion where the first lamp housing 32 is partially overlapped with the EM sensor 39, whereby it is possible to detect the location of the electronic (stylus) pen 200 even though the electronic pen 200 is positioned in the circumference of the EM sensor 39. At this time, the second lamp housing 35 is formed in "⊏" shape with a solid material for maintaining the shape of the first lamp housing 32 at a lamp side (D region), and supporting the first lamp housing 32. Also, the second lamp housing 35 is positioned at the circumference of the effective region of the EM sensor 39.

As shown in FIG. 4, the second lamp housing 35 is formed at the circumference of the reflecting plate 34 of the EM sensor 39. However, the second lamp housing 35 may have a margin corresponding to a portion from the circumference of the effective region of the EM sensor 39 to the reflecting plate 34. The reflecting plate 34 adheres to the light-guiding plate 33. In this state, an adhesive layer or adhesive is additionally formed on a lower rear of the light-guiding plate 33 for adhering the reflecting plate 34 to the light-guiding plate 33. In the aforementioned backlight unit, the light emitted from the fluorescent lamp 31 is concentrated on the incident surface of the light-guiding plate 33, and then the concentrated light passes through the light-diffusion plate 36 and the prism sheet 37, whereby the light is transmitted to the LCD panel 40. The EM sensor 39 has a larger size than the LCD panel 40 due to a voltage supply portion to each coil side and a signal supply portion from the controller as well as the effective region. Also, the EM sensor 39 is formed in a plate shape below the first and second lamp housings 32 and 35.

As mentioned above, the LCD device having the EM sensor according to the present invention has the following advantages.

In the LCD device having the EM sensor according to the present invention, the plastic film type first lamp housing concentrating the light emitted from the fluorescent lamp at one direction is formed to be partially overlapped with the light-guiding plate, and surrounding the fluorescent lamp, and the second lamp housing is formed to support and fix the first lamp housing. As a result, it is possible to remove a metal lamp housing in the effective region of the EM sensor whereby the signal transmission is smoothly performed between the EM sensor and the electronic (stylus) pen in the LCD device having the EM sensor according to the present invention, thereby detecting the correct location of the electronic (stylus) pen.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD device having an EM sensor comprising:
   an LCD panel;
   a backlight unit having a light-guiding plate below the LCD panel, a fluorescent lamp at one side of the light-guiding plate, and a reflecting plate on a lower surface of the light-guiding plate;
   a first lamp housing of a flexible material extending from the lower side of the reflecting plate and surrounding the fluorescent lamp at one side of the light-guiding plate;
   a second lamp housing surrounding and supporting the first lamp housing;
   a main supporter supporting the LCD panel and the backlight unit;
   an EM sensor below the main supporter and first and second lamp housings; and
   a case top surrounding the main supporter and a circumference of the LCD panel.

2. The LCD device having the EM sensor of claim 1, wherein the first lamp housing is formed of a plastic film.

3. The LCD device having the EM sensor of claim 2, wherein the plastic film is formed of any one of Poly Ethylene Terephtalate (PET), Poly Propylene Terephtalate (PPT), Poly Carbonate, and Poly Acrylate.

4. The LCD device having the EM sensor of claim 1, wherein the second lamp housing is formed surrounding the fluorescent lamp in a non-effective region of the EM sensor.

5. The LCD device having the EM sensor of claim 4, wherein the second lamp housing is formed of a metal material.

6. The LCD device having the EM sensor of claim 1, wherein the LCD panel includes upper and lower polarizing plates.

7. The LCD device having the EM sensor of claim 1, wherein the fluorescent lamp is below the LCD panel.

8. The LCD device having the EM sensor of claim 1, further comprising:
   a light diffusion plate arranged on the light guiding plate to uniformly diffuse light guided by the light guiding plate;
   a prism sheet arranged on the light diffusion plate to concentrate the light diffused in the light diffusion plate and to transmit the concentrated light to the LCD panel; and
   a protection sheet formed on the prism sheet to protect the prism sheet.

9. The LCD device having the EM sensor of claim 8, further comprising an adhesive layer arranged on a lower rear portion of the light guiding plate to adhere the reflecting plate to the light-guiding plate.

10. The LCD device having the EM sensor of claim 1, wherein the EM sensor includes a voltage supply portion and a signal supply portion.

11. The LCD device having the EM sensor of claim 1, further comprising a stylus.

12. The LCD device having the EM sensor of claim 11, wherein the stylus has a resonate circuit that generates a resonant magnetic field.

13. The LCD device having the EM sensor of claim 12, wherein the EM sensor detects the resonant magnetic field.

14. The LCD device having the EM sensor of claim 13, wherein the EM sensor has a plurality of coils.

15. The LCD device having the EM sensor of claim 14, further comprising a controller that detects the location associated with a resonant magnetic field.

16. The LCD device having the EM sensor of claim 14, wherein the plurality of coils includes a first set of aligned coils and a second set of aligned coils substantially perpendicular to the first set of aligned coils.

* * * * *